Aug. 30, 1960  A. J. SOWER  2,950,480
MACHINE FOR MAKING CARPET ANCHOR STRIPS
Filed Sept. 15, 1958  5 Sheets-Sheet 1

INVENTOR.
ALBERT J. SOWER
BY C. G. Stratton
ATTORNEY

Aug. 30, 1960  A. J. SOWER  2,950,480
MACHINE FOR MAKING CARPET ANCHOR STRIPS
Filed Sept. 15, 1958  5 Sheets-Sheet 3

INVENTOR.
ALBERT J. SOWER
BY C. G. Stratton
ATTORNEY

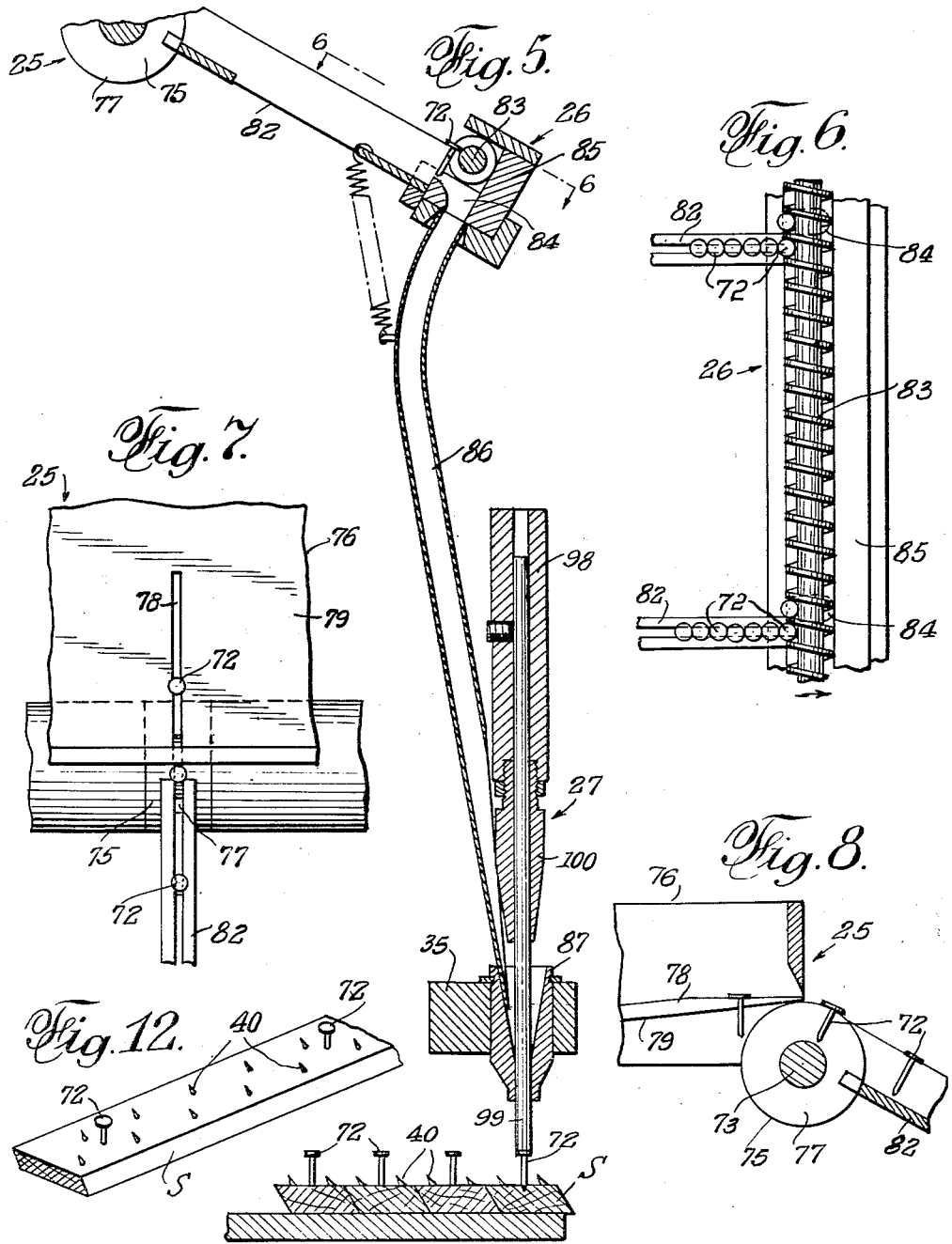

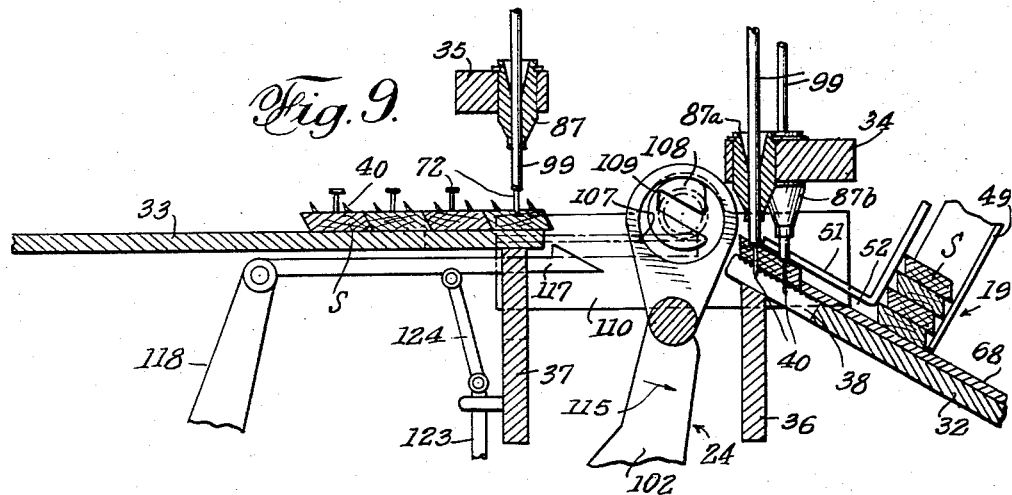
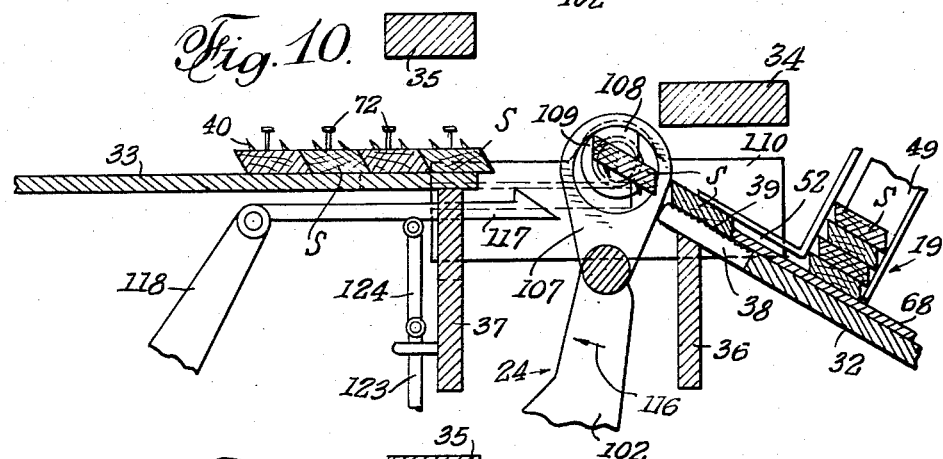
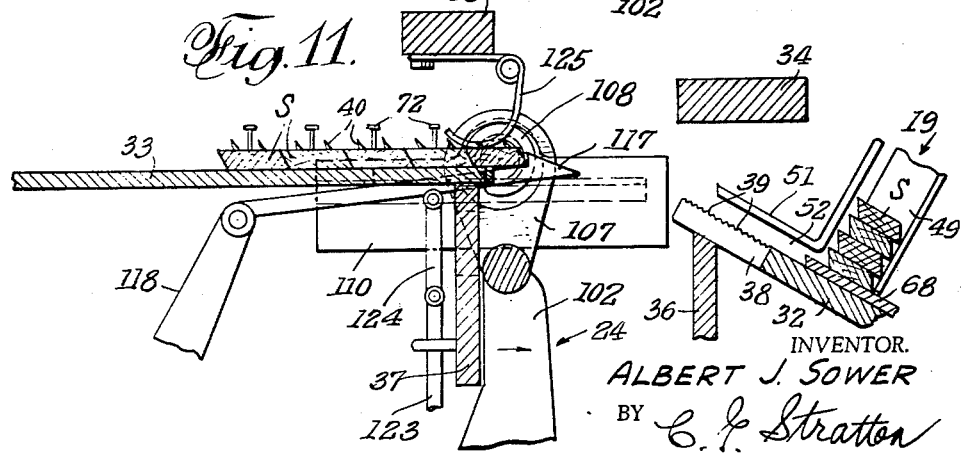

United States Patent Office 2,950,480
Patented Aug. 30, 1960

2,950,480

MACHINE FOR MAKING CARPET ANCHOR STRIPS

Albert J. Sower, North Hollywood, Calif.
(1021 Isabel St., Burbank, Calif.)

Filed Sept. 15, 1958, Ser. No. 761,202

10 Claims. (Cl. 1—1)

This invention relates to a machine for making strips that are adapted to be fastened to the floor at the bases of the walls of a room and which serve as means for anchoring the margins of wall-to-wall carpeting.

It is an object of the present invention to provide a machine that produces such strips in a continuous and automatic manner that is rapid and economical.

Another object of the invention is to provide such a machine that provides strips, automatically fed, with a full complement of carpet-anchoring barbs or nails while simultaneously providing a strip already provided with such barbs with a complement of fastening nails, brads or tacks.

A further object of the invention is to provide a machine of the character referred to that includes positive nail-feeding means to insure that a full complement of nails is provided on the strips as the same are successively fed to nail-receiving position.

A still further object of the invention is to provide a machine that sinks or drives the anchor barbs or nails and the strip-fastening nails from opposite sides and which reverses the strips after the barbs are provided so that both barb- and nail-driving means may operate from above.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 5 is an enlarged vertical sectional view of nail-feeding and -driving mechanism, the same constituting an enlargement of the upper left portion of Fig. 2.

Fig. 6 is a fragmentary plan view taken on the plane of the line 6—6 of Fig. 5 and showing metering means for regulating feed of nails to driving position.

Fig. 7 is a fragmentary plan view of means for effecting feed of nails to the metering means of Fig. 6.

Fig. 8 is a cross-sectional view of the means shown in Fig. 7.

Figs. 9, 10 and 11 are enlarged and fragmentary cross-sectional views of the central portion of the machine, as in Fig. 2, and showing, successively, the barb- and nail-driving positions of the strips, and two stages of the transfer positions of said strips.

Fig. 12 is a broken perspective view of a strip as produced by the present machine and according to the present method.

Figure 1:
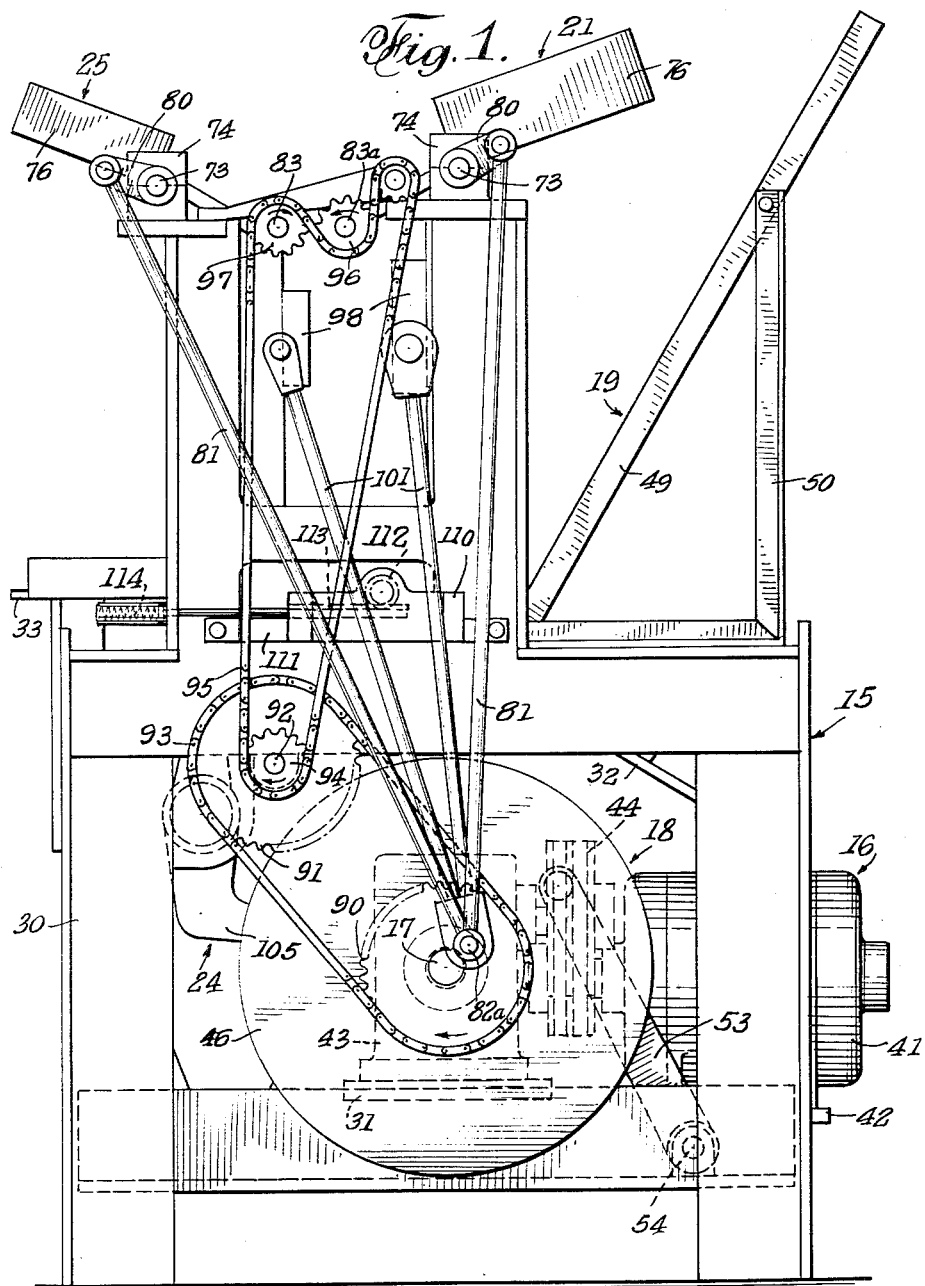
Fig. 1 is an end elevational view of a machine embodying the features of the present invention and comprising a preferred embodiment of the invention.

The present machine comprises a frame 15, prime mover mechanism 16 carried by the frame and terminating in a driven shaft 17, control cam means 18 driven by the shaft 17, means 19 for stacking a supply of strips S, means 20, controlled by the cam means 18, to feed strips intermittently and successively from said means 19, means 21 to feed barb-forming nails to a position where the same are ready to be driven into a strip S that has been fed from the stack means 19, means 22 to effect control of the feed means 21, means 23 to drive the nails thus fed into the strip, means 24, controlled by the cam means 18, to move the strip from barb-receiving position to nail-receiving position and to simultaneously invert said strip, means 25 to feed fastener nails to a position where the same are ready to be partly driven into the strip in the new position of the latter, means 26 to effect control of the feed means 25, and means 27 to drive the nails thus fed into the inverted strip.

The machine frame 15 is shown as comprising end frames 30 that are rigidly connected by a lower member 31, an upper forwardly disposed and upwardly sloping plate 32, a rearwardly disposed, preferably level, table plate 33, and bars 34 and 35 generally aligned with the respective nail-driving means 23 and 27. The plate 32, at its upper edge, may be supported and rendered rigid by a stiffener bar 36 and the table plate 33 may be similarly supported by a bar 37. The mentioned upper edge of the plate 32 is provided with slits 38 to define tongues that are provided with horizontal sharp serrations 39. Said slits accommodate the protruding sharp points of nails 40 driven into the strips S while the latter are in position, as in Fig. 9, and supported on the portion of plate 32 that has the serrations 39. The latter serve to counteract regression of the strip during driving of the nails 40.

The prime mover mechanism is shown as an electric motor 41 carried by a support bracket 42 extending inwardly from one of the frame ends 30, a speed reducer 43 mounted on frame member 31, and a drive 44 connecting said motor and speed reducer. The shaft 17 is the output of the speed reducer and has bearing, at each end, in bearing blocks 45 supported on member 31 immediately inward of the frame ends 30. Thus, shaft 17 has a slow and powerful drive force.

The control cam means 18 is shown as a cam 46 on each end of the driven shaft 17. While two cams are shown, it will be realized that only one may be used for operating the machine components that are driven by said cam means. In this instance, each cam 46 is provided with a face groove 47 and, as shown in Fig. 2, with a peripheral cam portion 48.

Figure 2:
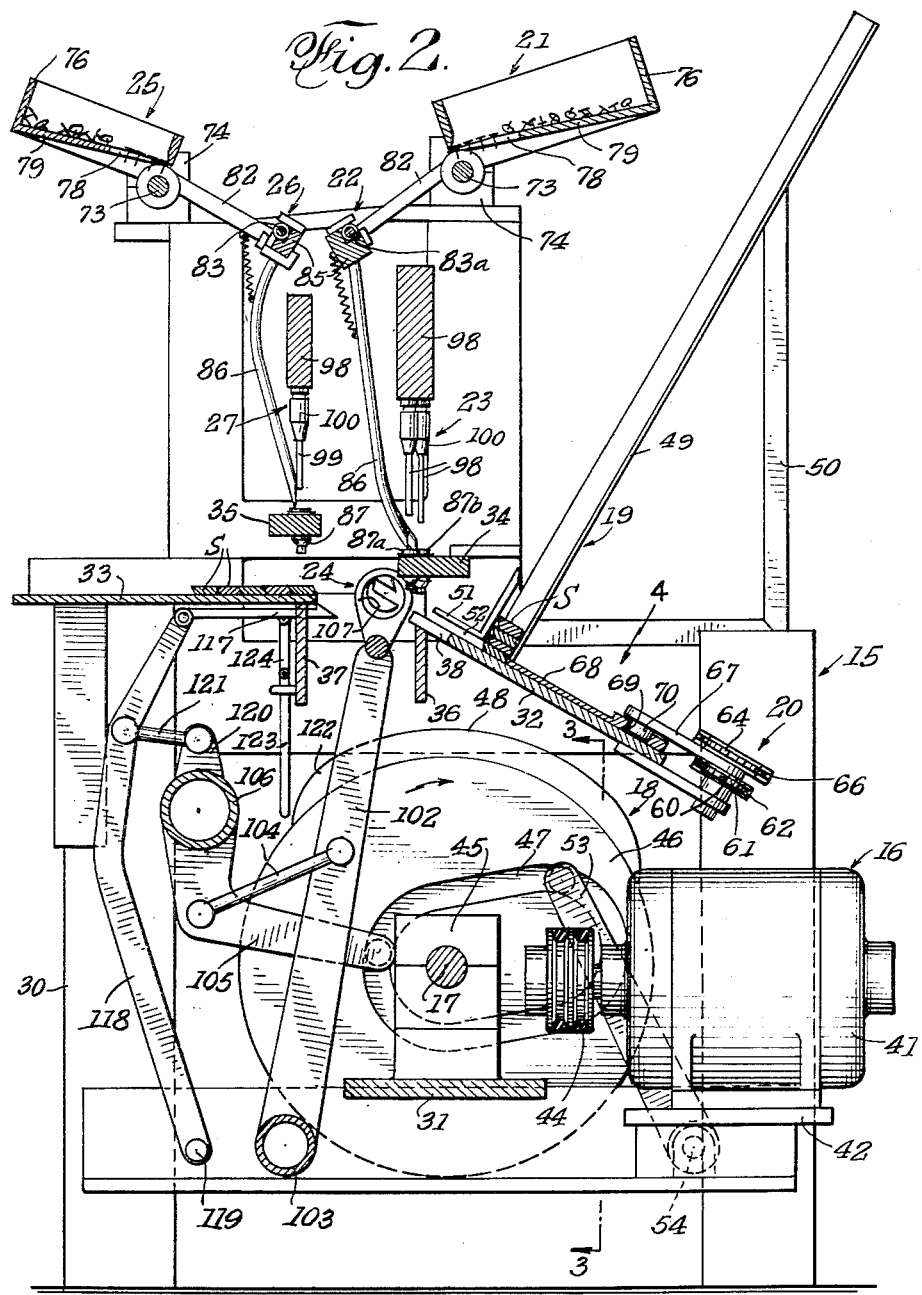
Fig. 2 is a cross-sectional view of said machine looking toward the far end of the machine shown in Fig. 1.
Figure 3:
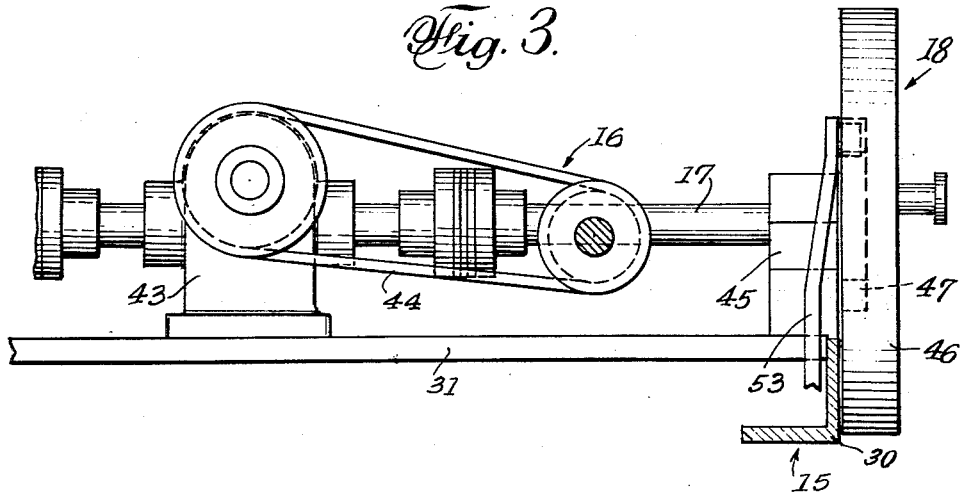
Fig. 3 is a fragmentary longitudinal sectional view showing a portion of the drive mechanism of the machine.

The means 19 is shown as racks 49, one carried by each frame end 30 to be normal to the plate 32 (see Fig. 2). Each rack has an angle form, the racks cooperating to engage the ends of a stack of strips S and hold the same in position resting upon said plate 32. A frame 50 serves to brace each rack 49. Cooperating with each rack 49 there is provided a guide member 51 that defines a passage 52 above the upper face of plate 32. It will be understood that upon displacement from the stack of the lowermost strip S, the same is guided by its ends through the end passages 52 and held by the member 51 against flexing upwardly from the support plate 32.

Figure 4:
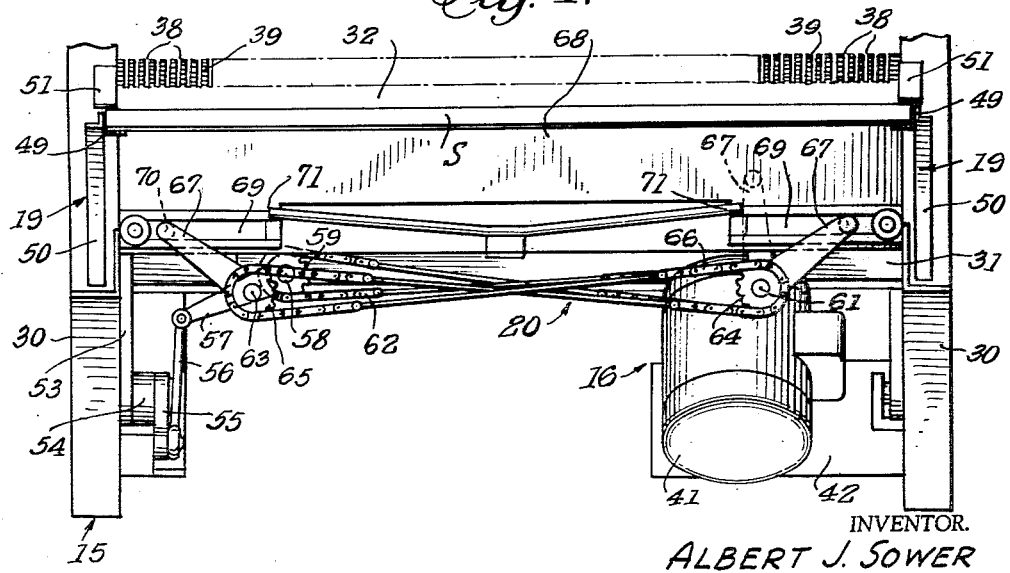
Fig. 4 is a plan view, taken in the direction of the arrow 4 of Fig. 2 and showing strip-feeding means as used in the present machine.

The means 20 for feeding strips S from the stack above described is best shown in Figs. 2 and 4. The same comprises an arm 53, pivoted at 54 to one frame end 30 and having a follower engaged in the groove 47 of the cam 46 on that side of the machine. An arm 55 is affixed to and rocks on pivot 54 in response to swinging movement of arm 53. A link 56, on the end of arm 55, is connected to an arm 57 on a center 58 fixed relative to the sloping plate. As can be seen in Fig. 4, oscillating movement of arm 57, as instituted by the cam groove, causes comparable oscillating movement of a sprocket wheel 59 affixed to said center 58. This oscillation of the sprocket wheel 59 is imparted to a sprocket wheel 60 (Fig. 2) on a center 61 longitudinally spaced from the center 58. A chain 62 connects said wheels 59 and 60 for this purpose.

A third center 63 is provided adjacent the center 58 and in symmetrical arrangement with center 61 between the frame ends. A sprocket wheel 64 on center 61 and a similar wheel 65 on center 63 are connected by a second chain 66. It will be clear, therefore, that, by crossing said chain 66, the two sprocket wheels 64 and 65 oscillate oppositely under control of cam groove 47. Hence, arms 67, affixed to said latter wheels, oscillate oppositely between low and high positions.

As can be seen in Fig. 4, the arms 67 are so set relatively that their oscillating movement may cause reciprocative movement of a strip-feeding plate 68 disposed on the sloping plate 32. Slots 69 in plate 68 are engaged by rollers 70 on the ends of arms 67 to reciprocate plate 68 as the arms 67 move between their low position (full lines of Fig. 4) and their high position (dot-dash lines at the right of Fig. 4). The low position of arms 67 holds the plate 68 retracted. The high position projects the plate 68 to the position of Fig. 9 with a strip S in position to receive barb nails 40.

Since, when the nails 40 are being driven, the forces applied tend to cause downward displacement of the strip along the face of plate 32, insurance that said strip is firmly held by the feed edge of plate 68 is had by providing a dead-center position of the arms 67 past which they cannot move. To this end, the arms 67 are engaged by stops 71 affixed to plate 32 when the feed plate 68 is in its most advanced position. Said plate 68 cannot retract until the cam groove institutes downward movement of the arms 67. Each reciprocation of plate 68 will feed the lowermost strip S from the stack to nailing position. The strip being thus fed will displace the nail-provided strip, as suggested in Fig. 10.

The means 21 to feed the barb nails 40 and the means 25 to feed fastener nails 72 are substantially alike. Hence, the following description of the means 25 will serve to describe the means 21 also.

As can be seen from Figs. 1, 2, 5, 6, 7 and 8, the control or metering means 26 is provided intermediates the beginning and the end of the feed means 21. Similarly, the metering means 22 is provided intermediate the beginning and the end of the feed means 21. Therefore, the means 22 and 26 will be described together.

The means 25 and 26 comprise a longitudinal rock-shaft 73 mounted in bearing blocks 74 provided on the upper ends of the frame ends 30. Said shaft, by means of hubs 75, carries a nail box or hopper 76. Said hub 75 has a nail-accommodating slot 77 and the hopper has an aligned slot 78 formed in its bottom wall 79. The nails 72 will hang by their heads as the same move along slots 72 and 78 and, to cause them to so move, the hopper is oscillated on the axis of shaft 73 by means of a rock arm 80 on shaft 73 and a link 81 connecting said rock arm with an eccentric point 82a that is rotated around the center of shaft 17 (see Fig. 1).

It will be clear that the nails in hopper 76 will be agitated in a manner to cause the nails, in good number, to find the slot 78 which guides them to slot 77 during an upward movement of the hopper, as above explained.

Fig. 12 shows an exemplary spacing of nails 72 in strip S. The slots 78 and 77 are spaced accordingly along the length of shaft 73.

On a downward slope and extending from each hub 75, there is provided a chute 82 along which said head-hung nails slide downwardly, as indicated in Figs. 7 and 8. The metering means 26 is provided at the end of such chutes and provides a means for removing one nail at a time from each chute 82 for each cycle of operation of the machine.

Said means 26 is shown as comprising a longitudinally disposed helix 83 that extends between the frame ends 30 and is continuously driven by means connected to the drive shaft 17 in the direction of the arrow of Fig. 6 in which it can be seen that for each turn of the helix 83, the same laterally displaces one nail 72 from each chute 82. Thus, the drive is arranged to cause one turn of the helix during a cycle of machine operation, the pitch being such that one such turn will displace one nail from chute 82. Since the nail head fits in the groove of the helix, the same, now unsupported by the chute, will fall into a passage 84 in a block 85 in which the helix is housed.

A tubular chute 86 comprises a continuing part of the means 25, the same extending from said block 84 and forming a guide down which the nail falls. At the lower end of said guide 86 and carried by the bar 35, there is provided a nail-receiving fitting 87 in which the nail hangs up preparatory to being driven into a strip S. Said fitting may be formed as a collet-provided chuck with spring-biased sectional jaws which cooperate to hang up a nail and which may be spread to allow the hung nail to fall or be driven, as above indicated.

As above indicated, the means 21 and 22 that release and meter nails 40 are similar to the above-described means. The differences are that there are more of them than there are of the means 25 and 26, they are closer spaced, accordingly, and, because the nails 40 are alternately offset along the strip S, the fittings 87a and 87b are alternately offset along bar 34 accordingly (see Fig. 9). Also, the helix 83a of the means 22 is formed to have a smaller pitch than helix 83, the pitch being such as to accommodate the smaller heads of the barb nails 40.

The hoppers 76 are oscillated and the helices 83 and 83a are rotated by power originating in shaft 17. A sprocket wheel 90 on said shaft drives a sprocket wheel 91 on a shaft 92 through a chain 93. A smaller sprocket wheel 94, on shaft 92, drives a chain 95 that is trained over a sprocket wheel 96 affixed to an end of the helix 83a and over a sprocket wheel 97 affixed to an end of the helix 83. It will be noted that each helix turns once for each revolution of shaft 17 and of cams 46.

The arms 80 that are fixed to shafts 73 are continuously oscillated, as hereinabove described, to joggle the nails in the two hoppers and to so tilt the hoppers during such oscillation as to cause a shift of head-hung nails onto the chutes 82 on both sides.

The nail-driving means 23 and 27 are also substantially alike and the description of one will serve to describe the other.

A longitudinal bar 98 is guided in the frame 15 and the same is provided with a set of nail-drivers 99 that may be adjustably carried by chuck fittings 100. Said drivers are aligned with the nail-holding chucks 87. Pitmans 101 connect the bars 98 and the mentioned eccentric point 82 so that one revolution of shaft 17 causes one full reciprocation of the bars 98. It will be understood that the nails 40 and 72 are driven simultaneously, the nails 40 into a strip S on the plate 32 and the nails 72 into an inverted strip on the table plate 33 and one already provided with barb nails 40. The depth to which the nails 40 and 72 may be regulated by the regulated extension of the different nail drivers 99. In practice, the drivers that set the barb nails 40 are regulated to drive the nails fully into the strip, as shown in Fig. 9 at the right, and the drivers that set the fastening nails 72 are regulated to drive said latter nails only partly into the inverted strip, as shown in said Fig. 9 at the middle thereof. The stroke of all the drivers is the same.

The strip-moving and -inverting means 24 is shown as comprising arms 102 mounted in the frame 15 on a pivot 103 so its free upper end may move transversely between plates 32 and 33. By means of links 104, said arms are connected to a cam-controlled arm 105 pivoted to the frame at 106. It will be clear from Fig. 2 that each revolution of the cams 46 causes a full oscillation of the arm 102.

At said free end of each arm 102, is provided an extension 107 that is engaged with a strip-end-receiving member 108. Said members extend toward each other from opposite ends of the machine frame 15 and the same are each provided with a slot 109 that, as seen in Fig. 10, may receive the end of a strip S after the latter has been provided with barb nails 40 and is displaced thereinto by the next strip S that is fed from the stack of strips.

Said members 108 are carried by slides 110 that are mounted on transverse slideways 111 and rotate in said slides. Such rotation is effected by a pinion gear 112 on each member and a rack 113 disposed above the slideway 111 and biased by a spring 114 in a direction counter to the movement of the slide when a strip S is being moved from plate 32 to a position on plate 33.

The arrow 115 in Fig. 9 indicates that the members 108 are approaching strip-receiving position. The arrow 116 of Fig. 10 indicates that arms 102 are now moving in a direction to transfer a strip, engaged with the opposite members 108, from plate 32 toward plate 33. Since the pinion gears 112 turn as the slide 110 moves rearwardly (to the left), the strip will be turned or inverted. Then, as said strip reaches the table 33 in inverted position, another portion of the means 24 becomes effective to shift the strip out of engagement with the members 108 so that the latter may return empty and in position to receive the next strip S being fed.

This stripping portion of the means 24 is shown as dog arms 117 just inward of the members 108 and connected by arms 118 on a pivot 119 to arms 120 by means of links 121. Said arms 120 are pivoted at 106 and are so connected to arms 105 that the cams 46 cause reciprocation of dog arms 117 in synchrony with the movement of arms 102.

Said dog arms are normally depressed, either by spring or gravitationally, so that a strip S may be transported therepast. A cam lobe 122 or a similar means is provided on each cam 46 to raise the dog arms to the position of Fig. 11 where the same engage behind the strip to draw the same out of engagement with the members 108. Then said members return to strip-receiving position. In this case, the cam lobes 122 are shown as engaging guided rods 123 and raising them so that link 124, that connects said rods and the dog arms 117, may raise the latter to strip-engaging position.

By providing friction springs 125 to engage the strips thus moved, the position of said strips is maintained during the operation that drives the nails 72. The nail-provided strips displace each other until shifted off the table top 33.

The above-described machine operates as follows:

The lowermost strip S of the stack 19 is fed along the plate 32 by the means 20 to a position upon the slitted and serrated upper end of said plate 32. While in this position, said strip is provided with two rows of nails 40 that, because of the slope of the strip, enter the same at an angle so that the protruding ends of the nails comprise slanted barbs. Said nails 40 are driven by the means 23 after the same have been fed by the means 21 and 22 from the hopper 76. Thus, with each reciprocation of the means 23, a nail in each fitting 87a and 87b is driven into the strip, since, as above indicated, there is a plurality of such fittings, arranged in two rows, the driven nails will form two rows of barbs on the strip.

The barb-provided strip is then transferred from plate 32 to the means 24 which deposits the strip on the plate 33 and inverts the same during such transfer to direct the barbs upwardly. It is in this position and during the operation of the means 23 that the strip is provided with fastener nails 72 in substantially the same way that the nails 40 were provided. Said nails 72 are entered squarely into the strip because the latter is in a horizontal position and only partly into the strip, as explained and as shown in Fig. 12.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what I claim and desire to secure by Letters Patent is:

1. A machine for making carpet anchor strips comprising means to move a strip to a first nail-receiving position, means to drive a plurality of barb-forming nails into and through said strip, said nails being arranged in two longitudinal rows and the nails of one row being offset from the nails in the other row, means to move said nail-provided strip to a second nailing position and to invert the strip during such movement, means to partly drive a series of longitudinally arranged strip-fastening nails into the strip from the side thereof that the barb ends of the first nails protrude, and means operable during movement of said strip to the second position to feed a second strip into position to replace the first strip.

2. A machine according to claim 1 provided with means to operate both nail-driving means simultaneously to drive nails into strips disposed in both nail-receiving positions.

3. A machine for making carpet anchor strips comprising means to hold a supply of strips in longitudinal disposition and in stacked relation, means to move the lowermost strip of said stack in a direction transverse to its length to a nail-receiving position, means to drive a plurality of barb-forming nails entirely into said strip with the nail ends protruding from the side of the strip opposite to the side into which the nails are driven, said nails being arranged in two longitudinal rows and the nails of one row being offset from the nails in the other row, means to move said nail-provided strip to a second nailing position and to invert the strip during such movement, means to partly drive a series of longitudinally arranged strip-fastening nails into the strip from the side thereof that the barb ends of the first nails protrude, and means operable during movement of said strip to the second position to feed a second strip into position to replace the first strip.

4. A machine according to claim 3 provided with means to operate both nail-driving means simultaneously to drive nails into strips disposed in both nail-receiving positions.

5. A machine for making carpet anchor strips comprising means to hold a supply of strips in longitudinal disposition and in stacked relation, means to move the lowermost strip of said stack in a direction transverse to its length to a nail-receiving position, means to drive a plurality of barb-forming nails entirely into said strip with the nail ends partly protruding from the side of the strip opposite to the side into which the nails are driven, said nails being aranged in two longitudinal rows and the nails of one row being offset from the nails in the other row, means to move said nail-provided strip from said first nailing position transversely to a second nailing position, means to invert said strip during the latter movement, and means to partly drive a series of longitudinally arranged strip-fastening nails into the strip from the side thereof that the barb ends of the first nails protrude.

6. A machine according to claim 5 in which the second nail-driving means is in parallel arrangement with the first nail-driving means, and means to operate both nail-driving means simultaneously.

7. A machine according to claim 6 provided with a transversely sloping support for the strip in the first position, and a horizontal support for the strip in the second position, the direction in which the nails are driven from both driving means being normal to the second support so that the barb-forming nails are driven at an angle to the sides of the strip and the fastening nails are driven normal to the strips.

8. In a machine for making carpet anchor strips, two spaced strip supports, means to move a first strip from one support to the other, means to invert said strip during such movement, means, independent of the first strip-moving means, to move a second strip to the support vacated by the first strip, means to move both strip-moving means simultaneously, and means to simultaneously drive nails into both strips on both supports.

9. In a machine according to claim 8, one of the supports being disposed to hold the strip thereon normal to the direction of nail movement into said strip, and the other support being sloped to support a strip thereon at a sloping angle to the direction of nail movement into said latter strip whereby the nails enter the latter strip obliquely.

10. In a machine according to claim 8, one of the supports being disposed to hold the strip thereon normal to the direction of nail movement into said strip, and the other support being sloped to support a strip thereon at a sloping angle to the direction of nail movement into said latter strip whereby the nails enter the latter strip obliquely, the nail-driving means including a nail driver that pushes nails partly into the strip that is normal to the direction of said nail movement, said nail-driving means further including a nail driver that pushes nails through the strip that is sloped with the nail ends protruding from the strip to form carpet-anchoring barbs.

References Cited in the file of this patent

UNITED STATES PATENTS

| | | |
|---|---|---|
| 543,683 | Hayes | July 30, 1895 |
| 2,195,421 | McLeod | Apr. 2, 1940 |